US008332741B2

(12) United States Patent
Evans et al.

(10) Patent No.: US 8,332,741 B2
(45) Date of Patent: Dec. 11, 2012

(54) METHOD AND SYSTEM FOR ON-DEMAND NARRATION OF A CUSTOMIZED STORY

(75) Inventors: Gregory M. Evans, Raleigh, NC (US); Christopher M. Amidon, Apex, NC (US); Farhad Fuad Islam, Cary, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 611 days.

(21) Appl. No.: 12/330,006

(22) Filed: Dec. 8, 2008

(65) Prior Publication Data
US 2010/0146398 A1 Jun. 10, 2010

(51) Int. Cl.
*G06F 17/28* (2006.01)
*G09B 17/00* (2006.01)
*G09B 19/00* (2006.01)

(52) U.S. Cl. ......... 715/202; 434/178; 434/236; 707/102
(58) Field of Classification Search .................... 715/744
See application file for complete search history.

(56) References Cited

U.S. PATENT DOCUMENTS

| | | | | |
|---|---|---|---|---|
| 6,041,280 | A | * | 3/2000 | Kohli et al. .................... 701/201 |
| 6,933,928 | B1 | * | 8/2005 | Lilienthal ...................... 345/173 |
| 7,246,315 | B1 | * | 7/2007 | Andrieu et al. ............... 715/706 |
| 7,333,967 | B1 | | 2/2008 | Bringsjord et al. |
| 2002/0124048 | A1 | * | 9/2002 | Zhou .............................. 709/203 |
| 2003/0097636 | A1 | * | 5/2003 | Cleveland ................... 715/501.1 |
| 2006/0112132 | A1 | * | 5/2006 | Maguire et al. ............... 707/102 |
| 2007/0048704 | A1 | * | 3/2007 | Tejera ............................ 434/236 |
| 2007/0150368 | A1 | * | 6/2007 | Arora et al. ...................... 705/26 |
| 2007/0256011 | A1 | * | 11/2007 | Jones ............................. 715/523 |
| 2007/0260743 | A1 | * | 11/2007 | Oijer ............................. 709/231 |
| 2009/0187463 | A1 | * | 7/2009 | DaCosta ......................... 705/10 |

OTHER PUBLICATIONS

Nuno Correia et al., "InStory: A System for Mobile Information Access, Storytelling and Gaming Activities in Physical Spaces," (article), Jun. 15-17, 2005, pp. 102-109, vol. 265, ACM International Conference Proceeding Series, Proceedings of the 2005 ACM SIGCHI International Conference on Advances in computer entertainment technology table of contents, Valencia, Spain.
David Crow et al., "M-Views: A System for Location-Based Storytelling," (article), Oct. 12-15, 2003, 4 pages, ACM UbiComp 2003, Seattle, WA.
No Author, PaSSAGE: Player-Specific Stories via Automatically Generated Events, (website), obtained Oct. 8, 2008, 2 pages.

* cited by examiner

*Primary Examiner* — Boris Pesin
*Assistant Examiner* — Matthew Ell
(74) *Attorney, Agent, or Firm* — Withrow & Terranova, PLLC

(57) ABSTRACT

A method and apparatus for on-demand narration of a customized story. A user indicates a desire via a user device to listen to a narrated customized story. A story service receives personalization information relating to the user associated with the user device, and obtains localization information relating to information associated with a location of the user device. A customized story is generated based on the personalization information and the localization information, and is narrated to the user device.

19 Claims, 3 Drawing Sheets

METHOD AND SYSTEM FOR ON-DEMAND NARRATION OF A CUSTOMIZED STORY

FIELD OF THE INVENTION

This invention relates to stories, and in particular to on-demand narration of a customized story.

BACKGROUND OF THE INVENTION

Story telling has long been a popular and important form of entertainment. Stories can provide information, be humorous, and be a pleasant distraction from boring activities, such as during a long trip in a vehicle or while waiting for the arrival of an airplane. Audio books are increasingly popular for this reason. The ability to download a narration of a book onto a low-priced digital player, such as an MP3 player, allows an individual to listen to a story on an on-demand basis.

A story including characters, situations, or events that relate to a listener is frequently more interesting than a story that does not relate to the listener. For example, a doctor may find a story that takes place in a hospital more interesting than a story that takes place in a law office. Similarly, a story including elements that relate to the current environment of the listener may increase the listener's enjoyment of the story. A listener driving through the Florida Keys may find a story involving a shark off the coast of Florida more interesting than a story involving a wolf in the Rocky Mountains simply due to the listener's current location.

Unfortunately, individuals frequently desire a story at a time when the individual does not have any readily available means to have a story narrated. For example, parents traveling on a long vacation in an automobile with children often wish they had some way to occupy the children. Thus, it would be beneficial if an individual or a group of individuals could request narration of a customized story on an on-demand basis.

SUMMARY OF THE INVENTION

The present invention relates to on-demand narration of a customized story. A user requests narration of a customized story. A customized story provider receives the request and obtains personalization information and localization information associated with the user. The personalization information can be obtained from a profile associated with the user, or can be entered by the user at the time of the request. The personalization information can include any relevant information regarding the user, such as age, occupation, sex, race, religion, and story preferences. The localization information can be obtained from the user device used to make the request, can be entered manually by the user, or can be obtained electronically from other information sources. For example, the customized story provider can obtain location information from the user device and query a third-party weather service to determine the current weather conditions at that location.

The customized story provider uses the personalization information and the localization information associated with the user to generate a customized story based in part on one or both of the personalization information and the localization information. The customized story can be generated in the form of a script which can be narrated by one or more readers. The customized story provider can contact a reader and provide the customized story to the reader. The reader can narrate the customized story for the user via the user device. The user may listen to the narration via a headset or, via conventional means, may connect the user device to a broadcast system, such as a car stereo system, and provide the narration to a number of listeners. According to another embodiment of the invention, the user can provide addresses of a plurality of user devices, and the narration can be sent to the plurality of user devices.

According to one embodiment of the invention, the customized story provider obtains reader information about an available reader prior to generating the customized story. The customized story can be generated based on the personalization information, the localization information, and the reader information. According to another embodiment of the invention, the customized story provider enables an advertiser to sponsor the customized story based on the localization information. The customized story provider can provide the localization information to a plurality of advertisers, and one of the plurality of advertisers may submit a bid indicating an interest in sponsoring the customized story. If the bid is accepted, the advertiser may provide information relating to services or products in the vicinity of the user. The customized story can be based on the personalization information, the localization information, and the advertiser information.

According to one embodiment of the invention, instead of using a reader to narrate the customized story, a text-to-speech module is used to narrate the customized story. The text-to-speech module can use a variety of electronic voices for different characters in the customized story.

According to another embodiment of the invention, a reader narrates one portion of the customized story, and one of a plurality of users narrates another portion of the customized story. For example, the customized story may be a children's story and may include an adult character and a child character. The customized story may be provided to the user device, and a child may read the portions of the script that relate to the child for the enjoyment and amusement of other users.

According to another embodiment of the invention, the customized story is generated in stages, and each stage is based on updated localization information obtained from the user device. In this manner, the customized story may subtly change based on changing environmental conditions over the duration of time, increasing enjoyment and relevance of the customized story to the user.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
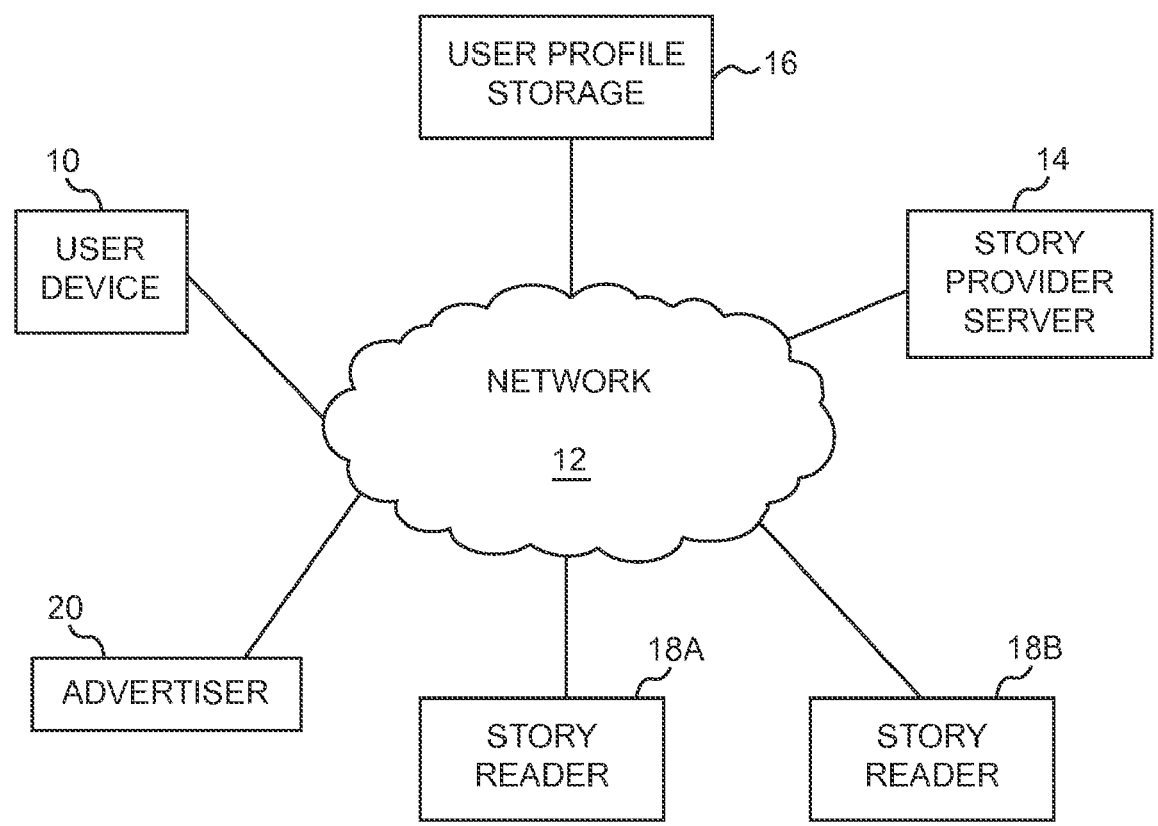
FIG. 1 illustrates a block diagram of a system in which one embodiment of the present invention may be practiced.

The present invention enables a user to request narration of a customized story based on information, such as personalization information or localization information, that is likely to increase interest of the customized story. Referring now to FIG. 1, a block diagram of a system in which one embodiment of the present invention may be practiced is illustrated. A user device 10 is coupled to a network 12 via a conventional network communications path. The user device 10 can comprise any suitable end user device, either fixed or mobile, such as a cell phone, a computer, a personal digital assistant, and the like. The communications path between the respective user device 10 and the network 12 may differ depending on the particular type of user device 10. For example, if the user device 10 is a cell phone, the communications path will likely be a cellular communications path. As another example, if the user device 10 is a computer, the communications path will likely be a wired or wireless Ethernet communications path. The network 10 comprises one or more networks that are communicatively coupled together and enable the transfer of data between devices across distances, as is known to those skilled in the art. According to one embodiment of the invention, the network 10 comprises the Internet, although any combination of proprietary or non-proprietary communication networks will be suitable for practicing the present invention.

The user device 10 can initiate a request for a customized story from a story provider server 14. The story provider server 14 can comprise any suitable processing device capable of implementing the functionality described herein. According to one embodiment of the invention, the story provider server 14 comprises a general purpose computer executing software capable of implementing the functionality described herein. The story provider server 14 receives the request for a customized story from the user device 10 and obtains personalization information associated with a user of the user device 10 from a user profile storage 16 that contains a user profile of a subscriber of the user device 10. The personalization information can comprise any suitable information relating to the user, including the user's sex, age, address, occupation, preferences, and the like. The user profile storage 16 can also include information about the user's family, such as number of children, ages, sex, and the like. Additionally or alternately, the story provider server 14 can request that the user provide particular personalization information prior to generating a customized story. For example, the story provider server 14 can send the user device 10 a form, such as a Hypertext Markup Language (HTML) form, requesting information about the user, and about any additional potential users that may listen to the customized story.

The story provider server 14 can also obtain localization information from the user device 10. Localization information can include any suitable information about a current environment associated with the user device 10 including, for example, a physical location of the user device 10, a time of day associated with the user device 10, aspects of the current weather associated with the user device 10, and the like. The localization information that can be obtained automatically from the user device 10 may depend on the functionality of the respective user device 10. For example, the user device 10 may only be capable of providing limited localization information, such as a current location and a current time of day. The story provider server 14 can enhance the limited localization information by querying third party resources (not shown), such as using the current location information to query a weather website to determine the current weather at that location. Alternately, the story provider server 14 can request localization information from the user at the time of the request for narration of a customized story.

The story provider server 14 can also obtain information regarding available narrators, referred to herein as readers 18, such as readers 18A and 18B, capable of narrating the requested customized story. The readers 18A and 18B can comprise any suitable individuals capable of reading a script into an associated narration device. The readers 18A and 18B can comprise employees of a story provider and can be located in a centralized facility, or can be geographically remote from the story provider. The readers 18A and 18B may also have associated reader information describing aspects of the respective readers 18A and 18B, such as sex, race, age, and story preferences or specialties. Narration devices can comprise any suitable electronic equipment capable of converting a voice into data for transmission over the network 12 to the user device 10. According to one embodiment of the invention, the narration device comprises a general purpose computer coupled to a pair of headphones and a microphone that is capable of receiving voice signals via the microphone and converting the voice signals into data for transmission over the network 12.

According to one embodiment of the invention, the story provider server 14 can also associate an advertiser 20 with the customized story. The story provider server 14 can provide certain localization information associated with the user device 10, such as location information, to one or more advertisers 20 and solicit bids from the advertisers 20 for association with the customized story. The advertisers 20 can determine whether the advertisers 20 have an interest in being associated with the customized story based on the localization information. For example, an advertiser 20 may determine that the advertiser 20 does not have any products or services in the vicinity of the user device 10 and therefore may decline to submit a bid. Alternately, an advertiser 20 may recognize that the user device 10 is in the vicinity of a number of retail outlets of the advertiser 20 and may submit a bid. The story provider server 14 can review the bids and select one or more advertisers 20 based on the bids.

The story provider server 14 then generates the customized story based on one or more of the personalization information, the localization information, the reader information, and the advertiser information. The customized story can be generated by conventional story-creation modules that generate a story based on one or more input parameters. The story-creation module can be owned or controlled by the story provider or by a third party. If the story-creation module accepts only limited types of input parameters, the story provider server 14 can map the desired information to the particular types of input parameters. For example, a story-creation module may accept an input parameter defining a particular type of landscape such as "plains," "ocean,"

"mountains," or "swamp." The story provider server 14 can use localization information, such as the current location of the user device 10, to determine which of the landscape types is most suited given the current location of the user associated with the user device 10.

The customized story generated by the story-creation module is preferably in the form of a script that can be read by one or more readers 18. For purposes of illustration, it will be assumed that the script is a story about two characters, and the reader 18A will read the lines associated with one character and the reader 18B will read the lines associated with another character. The story provider server 14 sends the customized story to the readers 18A and 18B for narration. The readers 18A and 18B may have a private discussion amongst themselves to discuss logistics of the narration, such as which reader 18A or 18B will narrate portions of the script that provide background and context rather than dialog. Preferably, such private discussions are not communicated to the user device 10. The readers 18A and 18B may determine that the reader 18A will take a lead role, and the reader 18A may begin to communicate with the user associated with the user device 10. The user may be listening to the readers 18 via any conventional mechanism associated with the user device 10. For example, the user may have a pair of headphones connected to the user device 10 which enables the user to listen to the readers 18A and 18B. Alternately, the user device 10 may be able to communicate with a broadcast system to enable the narration to be heard by a number of listeners in the vicinity of the user device 10. For example, the user device 10 may communicate with a car stereo system via Bluetooth wireless technology. The readers 18A and 18B narrate the customized story to the user device 10, providing the user a customized story that is based on one or more of the personalization information, the localization information, the reader information, and the advertiser information.

Data communication between the user device 10, the story provider server 14, the story readers 18, the user profile storage 16, and the advertiser 20 can comprise any suitable communications protocol, such as Transmission Control Protocol/Internet Protocol (TCP/IP), and can be in any suitable conventional or proprietary format that enables such communications. According to one embodiment of the invention, Internet Protocol Multimedia Subsystem (IMS) is used. As is known to those skilled in the art, IMS is an architectural framework for delivering IP multimedia to users.

Figure 2:
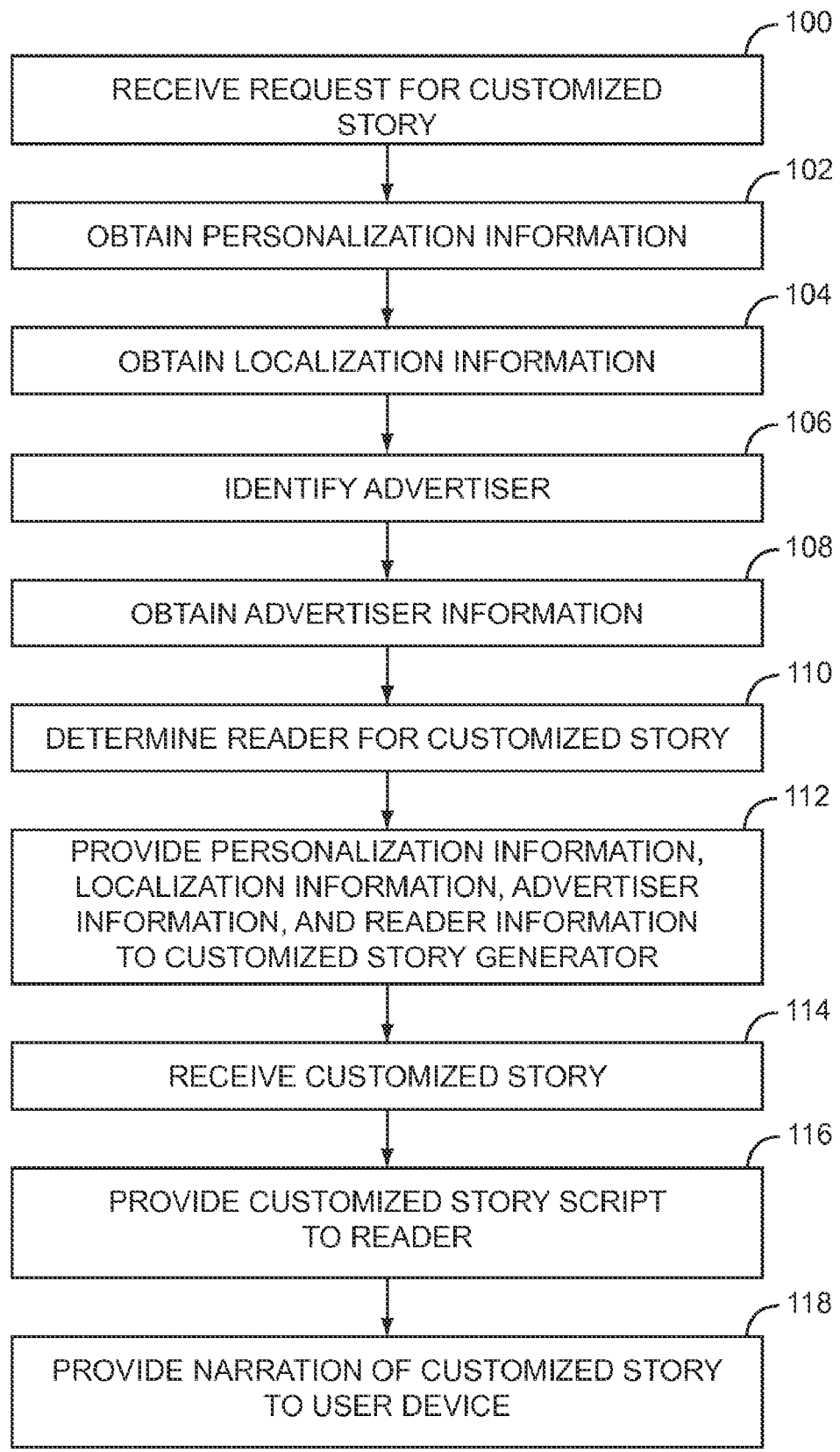
FIG. 2 is a flow chart illustrating a process for providing the narration of a customized story according to one embodiment of the present invention.

FIG. 2 is a flow chart illustrating a process for providing the narration of a customized story according to one embodiment of the present invention. It will be assumed for the purposes of illustration that a family travelling on a vacation in an automobile desires a narrated customized story for entertainment. One family member uses a user device 10 to request narration of a customized story from a story provider server 14. The request may comprise completing and transmitting a web page provided by the story provider server 14 and may include user preferences relating to the customized story, such as a mystery, a western, or a historical customized story. The story provider server 14 receives the request for narration of a customized story from the user device 10 (step 100). The story provider server 14 obtains personalization information about the user by querying, via IMS for example, the user profile storage 16 to obtain a user profile associated with the user (step 102). Additionally, the story provider server 14 may request additional personalization information from the user, such as the number of listeners and the age and sex of each listener, as well as logistical information such as the IP addresses of any devices to which the narration should be communicated.

The story provider server 14 also obtains, via IMS for example, localization information from the user device 10 (step 104). The localization information may comprise any environmental information that the user device 10 is capable of providing to the story provider server 14. The localization information may include, for example, the current location of the user device 10, the ambient noise level about the user device 10, and the current time of day. Additionally or alternately, the story provider server 14 may request localization information from the user.

According to one embodiment of the invention, the story provider server 14 can also identify an advertiser 20 that desires to be associated with the customized story (step 106). The advertiser 20 can be identified through conventional means such as selling an advertisement slot in advance to an advertiser 20, or can be identified as a function of the request for the customized story. According to one embodiment of the invention, a number of predetermined advertisers 20 have indicated an interest in being offered an opportunity to be associated with a customized story based on personalization information or localization information obtained by the story provider server 14. The story provider server 14 can provide localization information, or personalization information, to the predetermined advertisers 20, and the predetermined advertisers 20 can analyze the provided information and determine whether the predetermined advertisers 20 desire to be associated with the customized story. If so, the predetermined advertisers 20 can express such desire via a bid to the story provider server 14. The story provider server 14 may receive one or more bids from the predetermined advertisers 20 and determine whether to accept one or more of the bids. If the story provider server 14 accepts a bid, the story provider server 14 can request advertiser information from the predetermined advertiser 20, or use predetermined advertiser information that was provided by the predetermined advertiser 20 at the time the predetermined advertiser 20 expressed a desire to participate in such an offer (step 108).

Advertisers 20 may desire to be associated with a customized story, for example, because an advertiser 20 determines that the user is near or approaching a retail establishment of the advertiser 20. For example, the advertiser 20 may be a national restaurant chain. The advertiser 20 may determine from the localization information that the user is near a city where the advertiser 20 has a number of restaurants and that the time of day is nearing lunch time. The advertiser 20 may believe that, by being mentioned or otherwise integrated into the customized story, the likelihood that the user will patronize a restaurant of the advertiser 20 is increased.

According to one embodiment of the invention, one or more individuals capable of reading, or otherwise narrating, the customized story are associated with the story provider server 14. The story provider server 14 may determine the availability of one or more readers 18 prior to generating the customized story (step 110). The story provider server 14 may select a particular reader 18 that may be better suited based on personalization information or localization information than another reader 18. For example, if the listeners of the customized story are a plurality of young girls, a female reader 18 may be preferable. Alternatively, if the localization information indicates that the location of the user device 10 is in the southeast, a native South Carolinian reader 18 may provide a more enjoyable narration than a reader 18 from New York.

The story provider server 14 can provide one or more of the personalization information, the localization information, the advertiser information, and the reader information to a conventional customized story generator (step 112), such as that described in U.S. Pat. No. 7,333,967 to Bringsjord et al., entitled "METHOD AND SYSTEM FOR AUTOMATIC COMPUTATION CREATIVITY AND SPECIFICALLY FOR STORY GENERATION," the entirety of which is incorporated herein by reference. Such customized story generators are capable of receiving parameters defining various attributes and generating a customized story based on those parameters. If the information obtained by the story provider server 14 does not precisely align with the parameters recognized by the customized story generator, the story provider server 14 can map the obtained information into the appropriate parameters recognized by the customized story generator. The story provider server 14 may aggregate personalization or localization information from a plurality of users and provide the aggregated personalization or localization information to the customized story generator. Aggregation of information may be desirable where there are multiple users requesting a story. For example, age personalization information can be aggregated by averaging the users' ages. According to another embodiment, the story provider server 14 may receive multiple nearly simultaneous requests for stories from multiple users at multiple locations, and may aggregate the personalization or localization information before sending the personalization or localization information to the customized story generator. Such aggregation may be desirable, for example, where a well-known reader 18 is available, but only if there are a sufficiently large number of users who desire to listen to a story. Similarly, an advertiser 20 may desire to provide advertising for a particular story, but only if the majority of the users are in a particular region of the United States.

The customized story may be generated in the form of a script containing a story background, context, and dialog of one or more characters in the customized story (step 114). The customized story may integrate the personalization information, the localization information, the advertiser information, and the reader information into a customized story that both generates a high level of interest and enjoyment to the listeners, but also subtly or directly attempts to influence the listeners to patronize the advertiser.

The story provider server 14 can provide the script to the preselected reader 18 (step 116). The reader 18 can begin to narrate the customized story to one or more user devices 10 through any conventional means, such as via a microphone attached to a computer (step 118). Alternately, the story provider server 14 may use a text-to-speech module to electronically narrate the customized story to the one or more user devices 10. The text-to-speech module may be configurable to alter the vocalization as desired, such as a female or male voice, a young or old voice, and the like.

According to one embodiment of the invention, one or more listeners may be invited to participate in the narration of the customized story. If a listener indicates an interest to narrate, the customized story can be provided to the user device 10. The listener can talk with the reader 18 to determine which character the listener will narrate in the customized story, or the customized story can be altered by the reader 18 to identify the appropriate character to the listener. Participation by a listener in the narration may greatly increase the enjoyment for all the listeners. According to another embodiment of the invention, one or more characters in the customized story may be named after one or more listeners.

According to another embodiment of the invention, the customized story generator generates the customized story in stages. For each stage after the initial stage, updated localization information is obtained, and the next stage is generated based on the updated localization information. Each stage is provided to the reader 18 as it is generated. Iteratively generating the customized story in this manner can increase the enjoyment of the customized story by tracking changing environmental aspects being experienced by the listener. For example, if the listener was experiencing sunny weather at the time of the request, the customized story may begin in a setting of similar weather. Over the course of the narration of the initial stage of the customized story, the current weather conditions at the listener's location may worsen and turn stormy. The second stage of the customized story may likewise note that the weather in the customized story is turning stormy, and thus the weather change may play a role in the customized story.

The story provider server 14 may also indicate to the user device 10 either prior to or subsequent to the narration of the customized story that a recording of the customized story, such as a Compact Disk (CD) or a Digital Video Disk (DVD), can be purchased by the user.

Figure 3:
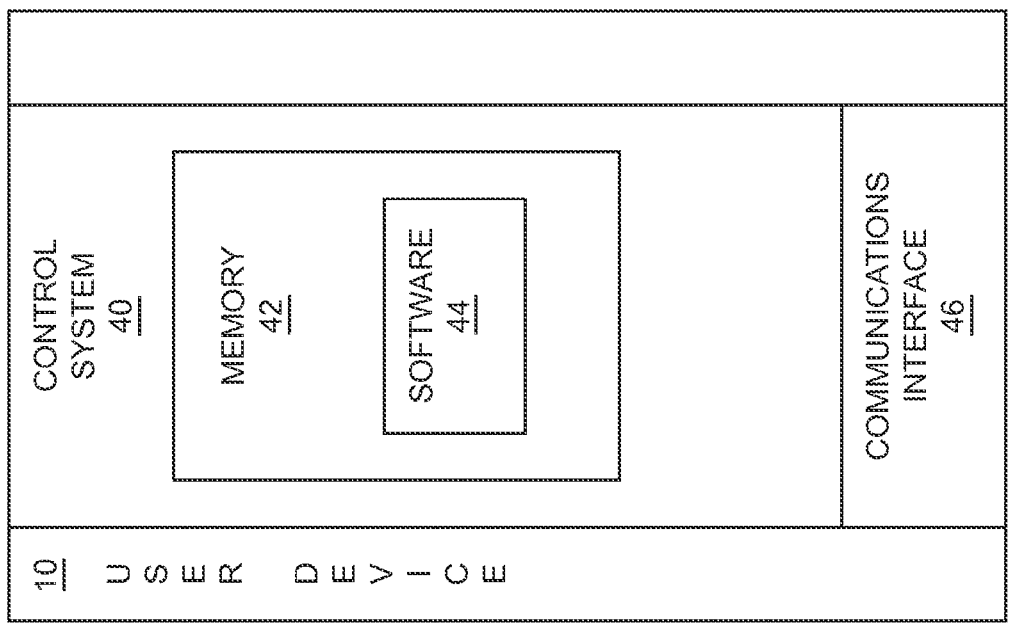
FIG. 3 is a block diagram of a user device according to one embodiment of the present invention.

FIG. 3 is a block diagram of a user device 10 according to one embodiment of the present invention. The user device 10 can include a control system 40 that includes a memory 42 in which software 44 resides that is suitable of implementing the functionality described herein. The control system 40 can include a general or special purpose processor that is capable of executing the software 44. Additionally or alternately, all or some of the functionality described herein may be embodied in circuitry, such as an application specific integrated circuit, in firmware, or the like. A communications interface 46 can include communications circuitry for communicating over the network 12, such as via cellular technology (third generation (3G), Worldwide Interoperability for Microwave Access (WiMAX), Long Term Evolution (LTE), or other fourth generation (4G) service, and the like), Local Area Network (WiFi, Ethernet, and the like), or any other suitable communications technology. The user device 10 can also include one or more input devices such as a touchscreen, a keypad or keyboard, or a mouse for enabling input by a user. The user device 10 also may have a speaker capable of playing the narration of the customized story, or may communicate the narration to a broadcast system, such a stereo system via a wired or wireless communications path. According to one embodiment of the invention, the user device 10 can comprise a cell phone, smart phone, Wide Area Network connected Personal Digital Assistant, multimedia player (Apple iTouch, Sony PlayStation Portable, and the like), or a networked computer.

Figure 4:
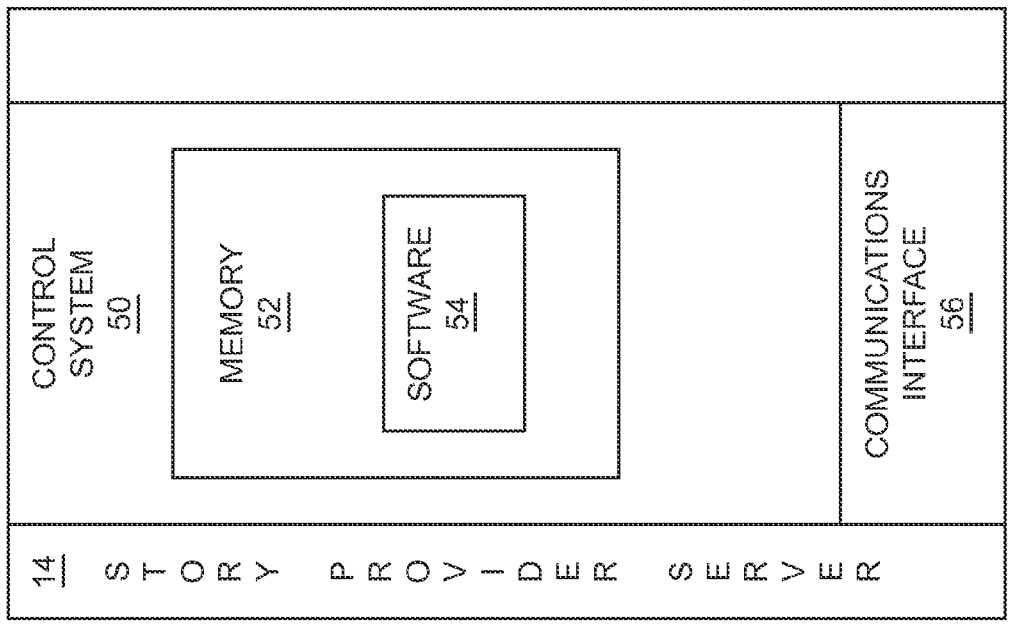
FIG. 4 is a block diagram of a story provider server according to one embodiment of the present invention.

FIG. 4 is a block diagram of a story provider server 14 according to one embodiment of the present invention. The story provider server 14 can include a control system 50 that includes a memory 52 in which software 54 resides that is suitable of implementing the functionality described herein. The control system 50 can include a general or special purpose processor that is capable of executing the software 54. Additionally or alternately, all or some of the functionality described herein may be embodied in circuitry, such as an application specific integrated circuit, or in firmware, or the like. A communications interface 56 can include communications circuitry for communicating over the network 12, such as via cellular technology or any other suitable communications technology. The user device 10 can also include one or more input devices such as a touchscreen, a keypad or keyboard, or a mouse for enabling input by an administrator. According to one embodiment of the invention, the story provider server 14 comprises a computer.

Those skilled in the art will recognize improvements and modifications to the preferred embodiments of the present invention. All such improvements and modifications are considered within the scope of the concepts disclosed herein and the claims that follow.

What is claimed is:

1. A method for providing an on-demand narration of a story comprising:
   receiving, by a server via a network, a request for a customized story from a user device;
   receiving personalization information relating to a user associated with the user device;
   receiving localization information relating to a current location of the user device;
   generating, by the server, the customized story based on the personalization information and the localization information, the customized story comprising a plot and at least one character; and
   effecting an audible narration of the customized story over the network to the user device by:
      selecting, by the server, a human reader from a plurality of human readers; and
      sending, by the server, the customized story to a computer associated with the human reader, wherein the human reader audibly narrates the customized story in real-time over the network to the user device.

2. The method of claim 1 wherein effecting the audible narration of the customized story over the network to the user device further comprises providing, by a plurality of preselected human readers, a spoken reproduction of the customized story over the network to the user device, each of the plurality of preselected human readers providing a portion of the spoken reproduction associated with a respective character in the customized story.

3. The method of claim 1 wherein effecting the audible narration of the customized story over the network to the user device further comprises providing, by the plurality of human readers, a spoken reproduction of the customized story over the network to a plurality of user devices, each of the plurality of human readers providing a portion of the spoken reproduction associated with a respective character in the customized story, and wherein at least one of the plurality of human readers is a user associated with one of the plurality of user devices.

4. The method of claim 1 further comprising identifying a first advertiser associated with the customized story, and wherein generating the customized story based on the personalization information and the localization information further comprises generating the customized story based on the personalization information, the localization information, and information associated with the first advertiser.

5. The method of claim 4 wherein the information associated with the first advertiser includes an identification of the first advertiser, and wherein the identification of the first advertiser is mentioned in the customized story.

6. The method of claim 4 wherein identifying the first advertiser associated with the customized story comprises providing a plurality of advertisers at least a portion of the localization information, and receiving a request from at least one advertiser based on the at least the portion of the localization information indicating a desire to be the first advertiser, and wherein the at least one advertiser is selected as the first advertiser.

7. The method of claim 1 wherein receiving the localization information relating to the current location of the user device and generating the customized story based on the personalization information and the localization information further comprises receiving localization information at a plurality of different times, the localization information changing each of the plurality of different times, and generating the customized story based on localization information received at least two of the plurality of different times.

8. The method of claim 1 wherein generating the customized story based on the personalization information and the localization information further comprises generating the customized story based on the personalization information, the localization information, and information associated with the human reader.

9. The method of claim 1 wherein effecting the audible narration of the customized story over the network to the user device further comprises effecting the audible narration of the customized story over the network to a plurality of user devices.

10. The method of claim 1 wherein generating the customized story based on the personalization information and the localization information further comprises including in the customized story a character identified by a name that is a same name as the user.

11. The method of claim 1 wherein the localization information comprises at least one of a physical location of the user device, a weather condition at the physical location of the user device, a time of day at the physical location of the user device, and an ambient noise level about the user device.

12. The method of claim 1 wherein the personalization information comprises at least one of a sex of the user, an age of the user, a race of the user, and a religion of the user.

13. An apparatus for providing a story comprising:
   a communications interface adapted to communicate over a network; and
   a control system coupled to the communications interface and adapted to:
      receive, via the network, a request for a customized story from a user device;
      receive personalization information relating to a user associated with the user device;
      receive localization information relating to a current location of the user device;
      generate the customized story based on the personalization information and the localization information, the customized story comprising a plot and at least one character; and
      effect an audible narration of the customized story over the network to the user device by:
         selecting, by the control system, a human reader from a plurality of human readers; and
         sending, by the control system, the customized story to a computer associated with the human reader, wherein the human reader audibly narrates the customized story in real-time over the network to the user device.

14. The apparatus of claim 13 wherein to effect the audible narration of the customized story over the network to the user device, the control system is further adapted to effect, by the plurality of human readers, a spoken reproduction of the customized story over the network to a plurality of user devices, wherein one of the plurality of human readers is a user of one of the plurality of user devices.

15. The apparatus of claim 13 wherein the control system is further adapted to identify a first advertiser associated with the customized story, and wherein to generate the customized story based on the personalization information and the localization information the control system is further adapted to generate the customized story based on the personalization information, the localization information, and information associated with the first advertiser.

16. The apparatus of claim 13 wherein to generate the customized story based on the personalization information and the localization information the control system is further adapted to generate the customized story based on the personalization information, the localization information, and information associated with the human reader.

17. A user device for receiving a story comprising:
a communications interface adapted to communicate over a network; and
a control system coupled to the communications interface and adapted to:
initiate, via the network, a request for a customized story from a story provider;
effect communication of personalization information relating to a user associated with the user device to the story provider;
effect communication of localization information relating to a current location of the user device to the story provider; and
receive an audible narration of the customized story over the network that is based on the personalization information and the localization information from a human reader selected by the story provider from a plurality of human readers, the story provider sending the customized story to a computer associated with the human reader, wherein the human reader audibly narrates the customized story in real-time over the network to the user device, and wherein the customized story is generated based on the personalization information and the localization information and comprises a plot and at least one character.

18. The user device of claim 17 wherein to receive the audible narration of the customized story over the network that is based on the personalization information and the localization information the control system is further adapted to receive the audible narration of the customized story over the network that is based on the personalization information, the localization information, and a first advertiser associated with the customized story.

19. The user device of claim 17 wherein to receive the audible narration of the customized story over the network that is based on the personalization information and the localization information the control system is further adapted to receive the audible narration of the customized story over the network that is based on the personalization information, the localization information, and information associated with the human reader of the customized story.

* * * * *